US006659755B1

(12) United States Patent
Bonnet et al.

(10) Patent No.: US 6,659,755 B1
(45) Date of Patent: Dec. 9, 2003

(54) DOUGH SHAPING MACHINE

(75) Inventors: Daniel Bonnet, Premery (FR); François Garcia, Urzy (FR); Frédéric Bernhard, Nevers (FR)

(73) Assignee: Electrolux Baking, Cagnes-sur-Mer (FR)

( * ) Notice: Subject to any disclaimer, the term of this patent is extended or adjusted under 35 U.S.C. 154(b) by 0 days.

(21) Appl. No.: 09/173,754

(22) Filed: Oct. 16, 1998

(30) Foreign Application Priority Data

Nov. 7, 1997 (FR) ............................................. 97 14056

(51) Int. Cl.⁷ ............................... A21C 3/02; A21C 7/01
(52) U.S. Cl. ....................... 425/193; 425/335; 425/337; 425/371
(58) Field of Search ................................ 425/193, 335, 425/337, 371

(56) References Cited

U.S. PATENT DOCUMENTS 5,862,743 A * 1/1999 Cimenti ...................... 425/337

FOREIGN PATENT DOCUMENTS

| EP | 0 791 292 | 8/1997 |
| FR | 1 125 463 | 10/1956 |
| FR | 1 487 071 | 10/1967 |
| FR | 2 722 654 | 1/1996 |
| GB | 2 219 963 | 12/1989 |

* cited by examiner

Primary Examiner—James P. Mackey
(74) Attorney, Agent, or Firm—Wenderoth, Lind & Ponack, L.L.P.

(57) ABSTRACT

This dough shaping machine includes, carried by a frame (12), a station (20) for rolling out dough, a station for rolling up the rolled out dough, a station for shaping the rolled up dough by stretching it and at least one conveyor (14, 16) for transferring the dough from the rolling out station (20) to the rolling up station (24) and the shaping station. Each conveyor (14, 16) constitutes a unitary assembly structurally separate from the frame (12) and is mounted on the latter through removable fixing members (130, 132).

17 Claims, 3 Drawing Sheets

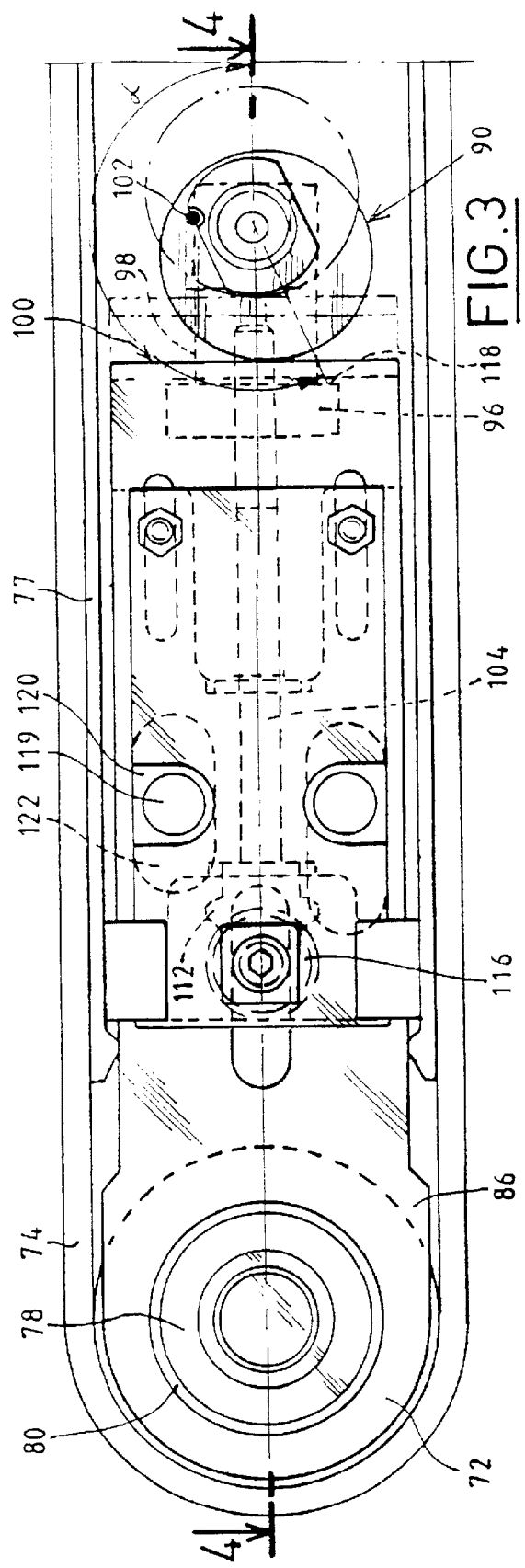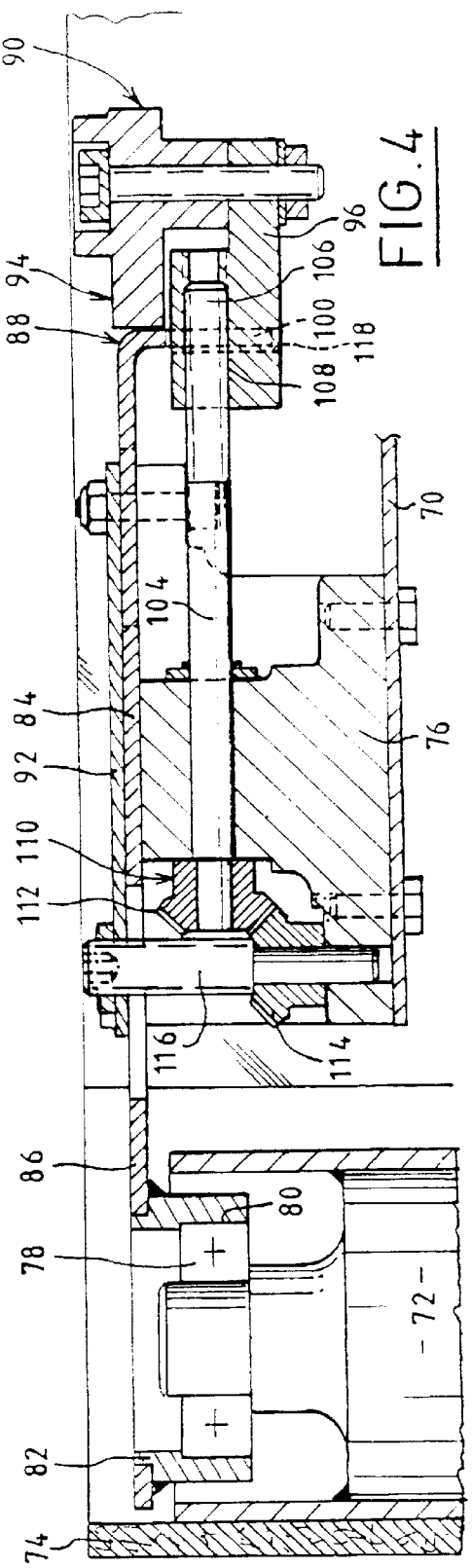

DOUGH SHAPING MACHINE

BACKGROUND OF THE INVENTION

The present invention concerns a dough shaping machine.

The invention is more particularly concerned with a machine for shaping dough comprising, mounted on a frame, a station for rolling out the dough, a station for rolling up the rolled-out dough, a station for shaping the rolled-up dough by stretching it, and at least one conveyor for transferring the dough from the rolling out station to the rolling up and shaping stations.

In the prior art the conveyors each comprise a conveyor belt driven by motorized rollers rotatably mounted on the frame.

In shaping machines of the above type, it takes a relatively long time to demount the conveyor or conveyors in that it necessitates demounting a part of the frame.

SUMMARY OF THE INVENTION

The aim of the invention is to overcome the above drawback.

Therefore, according to the invention, a dough shaping machine comprising, carried by a frame, a station for rolling out the dough, a station for rolling up the rolled-out dough, a station for stretching the rolled-up dough, and at least one conveyor for transferring the dough from the rolling out station to the rolling up station and the shaping station. These components form a unitary assembly structurally separate from the main frame and mounted thereon by removable fixing means, each conveyor including at least one conveyor frame equipped with drive rollers supporting a dough transfer belt, characterised in that the conveyor frame is provided with coarse adjustment means and with fine adjustment means for adjusting the tension in the belt by adjusting the distance between the drive rollers.

Accordingly, removal of the fixing means releases the conveyor or each conveyor, which can then be demounted.

The dough shaping machine of the invention can further have one or more of the following features:

the frame has two side flanges supporting the conveyor or each conveyor, the fixing means including a set of rods each insertable in a passage formed in one of the flanges and in a coaxial housing formed in the conveyor;

the housings for fixing the conveyor to the side flanges are formed in the frame;

the coarse adjustment means for adjusting the tension in the belt include a part movable axially relative to the frame of the conveyor by a cam mechanism and in which one of the drive rollers is rotatably mounted;

the cam mechanism includes an eccentric disk against which the mobile part is pressed by an elastic force exerted by the belt, the eccentric disk being mounted on a support to rotate between a first angular position tensioning the belt and a second angular position releasing the tension in the belt;

the means for fine adjustment of the tension in the belt include a screw for adjusting the axial position of the support relative to the frame of the conveyor on which the support is mounted;

the mobile part includes a plate having a first end portion equipped with a bearing support in which the drive roller is rotatably mounted and an opposite end portion forming an abutment bearing on the eccentric disk and mounted to slide on the support of the disk;

the end portion of the plate is a bent end of the plate or a separate part fixed to the plate;

the shaping machine includes a side plate mounted on the frame of the conveyor and spaced therefrom to delimit a space in which the mobile part slides during its axial displacement;

the shaping machine includes a first transfer conveyor belt having a first active face and a second active face that are mutually opposed and move in opposite directions and a second transfer conveyor belt having an active face substantially parallel to the second active face of the first conveyor and moving at a lower speed and in the opposite direction thereto, the first active face of the first conveyor delimiting an outward path for conveying rolled-out dough from the entry of the first conveyor to an intermediate point through the station for rolling up the dough and the second active face of the first conveyor and the active face of the second conveyor conjointly shaping the rolled-up dough and conveying it along a return path from the intermediate point to the exit from the second conveyor near the entry of the first conveyor;

the shaping machine further includes a third transfer conveyor belt downstream of the outward path near the intermediate point and extending towards a gap between the first conveyor and the second conveyor to assure active transfer of the rolled-up dough from the outward path to the return path;

each flange includes a side plate in which the passages receiving the fixing rods are formed, the plate being movable on the remainder of the flange by means controlling the distance between the first conveyor and the second conveyor.

BRIEF DESCRIPTION OF THE DRAWINGS

Other features and advantages will emerge from the following description given by way of example only and with reference to the accompanying drawings, in which:

FIG. 3 is a side view of one conveyor of the shaping machine from FIG. 1; and

FIG. 4 is a plan view in longitudinal section taken along the line 4—4 in FIG. 3.

DETAILED DESCRIPTION OF THE INVENTION

Figure 1:
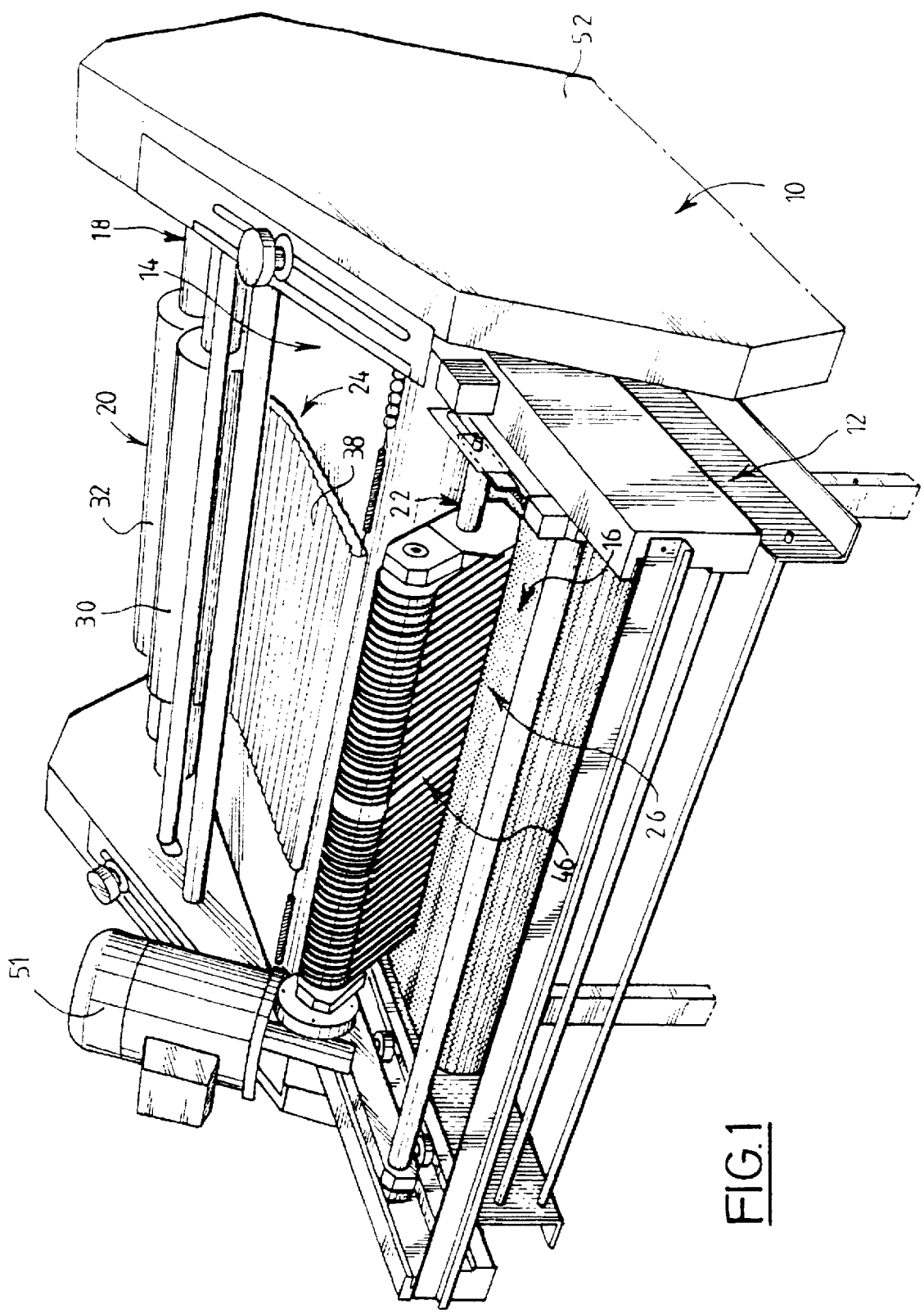
FIG. 1 represents a perspective view of a shaping machine of the invention.
Figure 2:
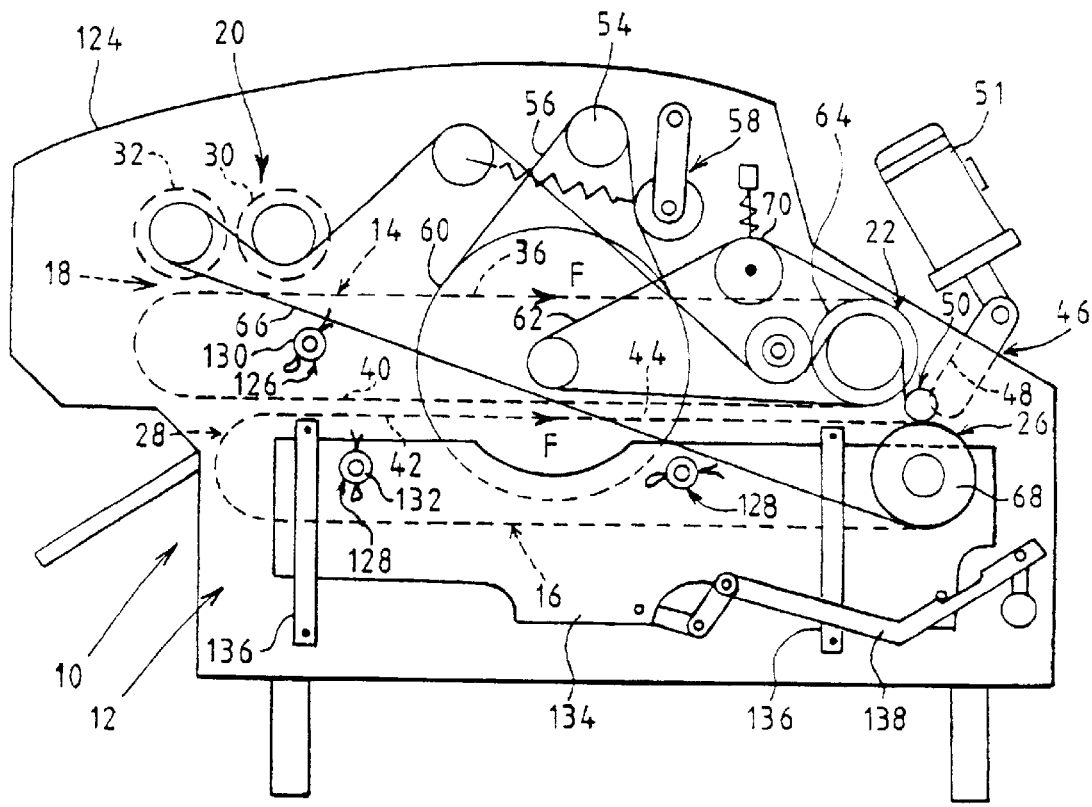
FIG. 2 represents a diagrammatic profile view of the shaping machine from FIG. 1 after removing the protective housings.

Referring to FIGS. 1 and 2, a dough shaping machine 10 of the invention includes a main frame 12 constructed from metal beams and sections, for example, and on which are mounted, one above the other, two motorized conveyor belts for transporting dough, namely a first conveyor 14 at the top and a second conveyor 16 at the bottom.

The two conveyors 14 and 16 conjointly constitute a station for transferring dough along an outward path from its entry, consisting of a first end 18 of the top conveyor 14, to an intermediate point, consisting of the opposite end 22 of the top conveyor 14, through a station 24 for rolling up the dough and then, after being transferred to a first end 26 of the bottom conveyor 16, along a return path from the intermediate point to the exit from the conveyor station, consisting of the opposite end 28 of the bottom conveyor 16 located near the entry of the conveyor station.

A rolling out station 20 comprises two associated rolling out drive rolls 30 and 32 facing an entry hopper (not shown) for feeding the shaping machine with dough.

The belt of the top and bottom conveyors 14 and 16 travels in the same direction represented by an arrow F in FIG. 2, the belt of the top conveyor 14 moving faster than that of the bottom conveyor 16.

The first conveyor 14 has a top active face 36 delimiting the outward path and cooperating with a fixed belt 38 with which it forms the station 24 for rolling up the dough. The belt 38 is, for example, a flexible plate made from an appropriate material for the intended use, for example of food grade stainless steel wire. In conjunction with the active top face 36, it rolls up the rolled out dough delivered to the exit from the rolling out station 20, in the conventional way.

The top conveyor 14 also has a bottom active face 40 extending parallel to and moving in the opposite direction relative to the top active face 36.

It cooperates with the top active face 42 of the bottom conveyor 16 to delimit the return path and constitute a station 44 for stretching the rolled up dough.

The active top face 42 of the bottom conveyor 16 is substantially parallel to and moves in the opposite direction to the active bottom face 40 of the top conveyor 14.

The active faces 40 and 42 are slightly convergent and the distance between them at the intermediate point 22 is substantially the same as the diameter of the rolled up dough delivered to the exit from the rolling up station 24 while at the exit 28 from the conveyor station the distance between them is the same as the required diameter of the dough.

The shaping machine further includes a third motorized conveyor 46 downstream of the outward path and near the intermediate point 22.

It has an active face 48 facing towards the top conveyor 14 and extending towards a gap 50 between the top and bottom conveyors 14 and 16.

The third conveyor 46 is driven by drive means 51 at a speed lower than that of the top conveyor 14 and greater than or equal to that of the bottom conveyor 16 so that the facing surfaces of the first and third conveyors move in opposite directions to rotate the rolled up dough and transfer it into the gap 50.

The third conveyor 46 is advantageously mounted on the frame 12 so that it can be moved axially about a stable equilibrium positon shown in FIG. 2 between a retracted position in which it is moved away from the top conveyor 14 and an advanced position for pushing the dough between the top and bottom conveyors.

As can be seen in FIG. 2, in which lateral protective housings 52 of the shaping machine from FIG. 1 have been removed, the shaping machine is completed by drive means which drive the top conveyor 14 and the bottom conveyor 16 in the manner previously described and rotate the rolling out rolls 30 and 32.

In particular, the drive means include a main drive gear 54 driving a reducing gear 60 via a belt 56 associated with a tensioner 58. The reducing gear 60 drives a drive gear 64 also associated with a reducing gear via a second belt 62.

The gear 64 drives a roller driving the top conveyor 14, not shown in this figure, and, via the reducing gear and at least one drive belt 66, a gear 68 cooperating with a drive roller of the bottom conveyor 16, not shown in this figure, and the rolling out rolls 30 and 32.

The belts 62 and 66 are conventionally associated with tensioners 70.

A detailed description of the top conveyor 14 and the bottom conveyor 16 will now be given with reference to FIGS. 3 and 4, which show the structure of one part of the conveyors.

The conveyor shown in these figures constitutes a conveyor belt forming a unitary assembly structurally separate from the main frame 12 carrying it.

The conveyor includes: a metal framework 70; two drive rollers 72, one of which is driven by one of the drive gears 64 and 68, supporting a dough transfer belt 74; and a conveyor 76 fastened to the framework 70 and carrying one of the rollers.

Two longitudinal plates 77 are mounted on the framework 70 to constitute a guide surface on which the belt 74 slides.

The frame 76 is provided with means for adjusting the tension in the belt 74 by axial displacement of the drive roller 72 relative to the framework 70.

The other drive roller is identical to the roller 72 shown in this figure. However, it is fixed in position by a part fixedly attached to the framework 70.

It is therefore axially immobilized relative to the framework in the direction of the longitudinal axis of the conveyor.

As can be seen in FIG. 4 in particular, the drive roller 72 is provided with a bearing 78 mounted in a bearing support 80 in a supporting part 82 that can be moved axially relative to the framework 70 and the frame 76 by means for adjusting the tension in the belt 74.

The adjustment means include means for coarse adjustment and means for fine adjustment of the tension in the belt by adjusting the distance between the drive rollers and in particular the axial position of the drive roller 72 carried by the support part 82.

As can be seen in FIG. 4, the means for adjusting the tension in the belt 74 include a part that can be moved axially relative to the frame 76 of the conveyor consisting of a plate 84 having a first end portion 86 attached to the support part 82 and an opposite end portion 88 forming an abutment cooperating with a cam mechanism 90.

As can be seen in this figure, the end portion 88 forming the abutment is a bent end portion of the plate 84 provided with lateral branches.

The middle part of the plate 84 slides relative to the frame 76 in a space delimited by the frame and by a lateral plate 92 fixed to the frame 76.

The cam mechanism 90 includes an eccentric disk 94 against which the bent end 88 of the plate 84 is pressed by a spring effect exerted by the belt 74. The eccentric disk is rotatably mounted on a support 96 which has planar lateral surfaces 98 (FIG. 3) guiding the lateral branches 100 extending the bent end 88 of the plate 84 when it slides.

As can be seen in FIG. 3, the eccentric disk 94 is mounted on the support 96 so that it can rotate between two end positions, namely a first angular position for tensioning the belt 74, shown in full line, in which the disk 94 bears against an abutment limiting its angular displacement opposing the force applied by the belt 74 and a second angular position releasing the tension in the belt, shown in chain-dotted line in FIG. 3.

As can be seen in this figure, the angular displacement of the eccentric disk 94 between these positions is by an angle α greater than 180°. Clearly the angular position for tensioning the belt constitutes a stable angular position with the disk 94 bearing against the abutment 102.

Because of the elastic force exerted by the belt 74 on the mobile plate 84 through the intermediary of the drive roller 72 the mobile plate bears at all times against the eccentric disk 94.

Rotation of the eccentric disk from the first angular position towards the second angular position therefore suddenly relieves the tension in the belt.

Conversely, rotation of the eccentric disk 94 from the second angular position towards the first angular position suddenly tensions the belt 74.

As can also be seen in FIGS. 3 and 4, the conveyor is additionally provided with a screwthreaded rod 104 for fine adjustment of the tension in the belt.

The screwthreaded rod 104 has a rear end engaging in a screwthread 108 in the support 96 and an opposite end 110 equipped with a gear 112 meshing with a complementary gear 114 fastened to a rod 116 for adjusting the angular position of the screwthreaded rod 104 using an appropriate tool.

The support 96 has lateral shoulders 118 on which the lateral branches 100 of the mobile part 84 bear.

Axial displacement of the support 96 therefore brings about corresponding displacement of the mobile part 84.

This enables fine adjustment of the angular position of the screwthreaded rod 104 and thus of the axial position of the support 96.

It is therefore clear that rotation of the control rod 116 provides fine adjustment of the tension in the belt 74.

Furthermore, the frame 76 is provided with housings or passages 119 and the side plate 92 and the mobile plate 84 are provided with respective complementary orifices 120 and 122, whereby the passages 119 are accessible from the exterior of the conveyor.

Referring again to FIG. 2, the frame 12 of the shaping machine has two side flanges 124, only one of which can be seen in this figure. Each flange 124 has pairs of orifices 126 and 128 in the wall constituting it.

The passages 119 in the frame 76 are intended to be aligned coaxially with the orifices 126 and 128 in the flanges 124 when mounting the conveyor.

Rods 130 and 132, only a few of which are shown in FIG. 2 for the sake of clarity, are inserted in the orifices 126 and 128 and in the housings 119 to fix the top conveyor 14 and the bottom conveyor 16.

Each conveyor is fixed by inserting a rod into one of the passages 119, the other passage not being used. This facilitates mounting in that each conveyor can be reversibly mounted on the flanges 124 using any of the passages.

As can also be seen in FIG. 2, the passages 128 which receive the rods 132 for fixing the bottom conveyor 16 are in a side plate 134 movable in guides 136 relative to the remainder of the flange 124 by a lever arm 138.

This adjusts the distance between the top conveyor 14 and the bottom conveyor 16.

The conveyors 14 and 16 clearly constitute unitary structures separate from the frame 12 that carries them and are fixed to the latter by means of removable rods.

Thus demounting the conveyors is a very simple procedure.

Demounting merely entails removing the rods 130 and 132. After demounting the conveyors it is equally very simple to replace the belts 74 that transfer the dough by suddenly releasing the tension in them. They can then be easily removed from the drive rollers.

Likewise, refitting the belt is a simple and fast operation.

This operation merely consists in fitting the belt around the drive rollers, suddenly tensioning the conveyor belt using the coarse adjustment means and mounting the conveyors on the side flanges 124 using the removable rods 130 and 132.

The tension in the belt can be finely adjusted using the adjustment rod 116 before refitting the conveyors, if required.

In the embodiment previously described, the second end area 88 of the plate 84 forming an abutment consists of a bent end of the latter provided with side branches cooperating with the support 96.

In a different embodiment the plate 84 could have an attached part forming an abutment fixed to it and having an active surface offset relative to the general axis of the plate and cooperating with the support.

For example, the attached part could have an annular active surface and the support could have a tubular middle part with the lateral shoulders of the support replaced by a circular shoulder on which the annular surface of the attached part would bear during tensioning of the belt.

What is claimed is:

1. A dough shaping machine comprising:
   a main frame;
   a unitary assembly structurally separate from said main frame and mounted on said main frame by removable fixing members;
   wherein said unitary assembly comprises a rolling-out station for rolling out dough, a rolling-up station for rolling up the rolled-out dough, a stretching station for stretching the rolled-up dough, at least one conveyor for transferring the dough from said rolling-out station to said rolling-up station, and a shaping station;
   wherein said at least one conveyor includes a dough transfer belt, and at least one conveyor frame equipped with drive rollers supporting said dough transfer belt; and
   wherein said at least one conveyor frame is provided with a coarse adjustment mechanism and a fine adjustment mechanism for adjusting tension in said dough transfer belt by adjusting a distance between said drive rollers.

2. A shaping machine according to claim 1 wherein said main frame has two side flanges supporting said at least one conveyor, said fixing members including a set of rods each insertable in a passage formed in one of said flanges and in a coaxial housing formed in the conveyor.

3. A shaping machine according to claim 2 wherein said housing is formed in said conveyor frame.

4. A shaping machine according to claim 2 wherein said at least one conveyor comprises a first transfer conveyor having a first active face and a second active face that are mutually opposed and move in opposite directions, and a second transfer conveyor having an active face substantially parallel to said second active face of said first conveyor and movable at a lower speed and in an opposite direction thereto, said first active face of said first conveyor delimiting an outward path for conveying the rolled-out dough from an entry of said first conveyor to an intermediate point through said rolling-up station, and said second active face of said first conveyor and said active face of said second conveyor conjointly shaping the rolled-up dough and conveying the dough along a return path from said intermediate point to an exit of said second conveyor near the entry of the first conveyor.

5. A shaping machine according to claim 4 further comprising a third transfer conveyor downstream of said outward path near said intermediate point and extending towards a gap between said first conveyor and said second conveyor to assure active transfer of the rolled-up dough from said outward path to said return path.

6. A shaping machine according to claim 5 wherein each of said flanges includes a side plate in which said passages receiving said rods are formed, and wherein said plate is movable on one of said flanges by controlling a distance between said first conveyor and said second conveyor.

7. A shaping machine according to claim 1 wherein said coarse adjustment mechanism includes a mobile part movable axially relative to said conveyor frame by a cam mechanism and in which one of said drive rollers is rotatably mounted.

8. A shaping machine according to claim 7 wherein said cam mechanism includes an eccentric disk against which said mobile part is pressed by an elastic force exerted by said transfer belt, said eccentric disk being mounted on a support to rotate between a first angular position tensioning said transfer belt and a second angular position releasing the tension in said transfer belt.

9. A shaping machine according to claim 8 wherein said support is mounted on said conveyor frame, and said fine adjustment mechanism includes a screw for adjusting the axial position of said support relative to said conveyor frame.

10. A shaping machine according to claim 9 wherein said mobile part includes a plate having a first end portion equipped with a bearing support to which one of said drive rollers is rotatably mounted and an opposite end portion forming an abutment for bearing against said eccentric disk and mounted to slide on said support.

11. A shaping machine according to claim 8 wherein said mobile part includes a plate having a first end portion equipped with a bearing support to which one of said drive rollers is rotatably mounted and an opposite end portion forming an abutment for bearing against said eccentric disk and mounted to slide on said support.

12. A shaping machine according to claim 11 wherein said opposite end portion of said plate comprises a bent end of said plate.

13. A shaping machine according to claim 11 wherein said opposite end portion of said plate comprises a separate part fixed to said plate.

14. A shaping machine according to claim 7 further comprising a side plate mounted on said conveyor frame and spaced therefrom to delimit a space in which said mobile part slides during axial movement thereof.

15. A shaping machine according to claim 1 wherein said at least one conveyor comprises a first transfer conveyor having a first active face and a second active face that are mutually opposed and move in opposite directions, and a second transfer conveyor having an active face substantially parallel to said second active face of said first conveyor and movable at a lower speed in an opposite direction thereto, said first active face of said first conveyor delimiting an outward path for conveying the rolled-out dough from said entry of said first conveyor to an intermediate point through said rolling-up station, and said second active face of said first conveyor and said active face of said second conveyor conjointly shaping the rolled-up dough and conveying the dough along a return path from said intermediate point to an exit of said second conveyor near the entry of the first conveyor.

16. A shaping machine according to claim 15 further comprising a third transfer conveyor downstream of said outward path near said intermediate point and extending towards a gap between said first conveyor and said second conveyor to assure active transfer of the rolled-up dough from said outward path to said return path.

17. A shaping machine according to claim 15 wherein said main frame has two side flanges supporting said at least one conveyor, said fixing members including a set of rods each insertable in a passage formed in one of said flanges and in a coaxial housing formed in the conveyor wherein each of said flanges includes a side plate in which said passages receiving said rods are formed, and wherein said plate is movable on one of said flanges by controlling a distance between said first conveyor and said second conveyor.

\* \* \* \* \*